(12) United States Patent
Shibano et al.

(10) Patent No.: US 11,929,611 B2
(45) Date of Patent: Mar. 12, 2024

(54) CONTROL DEVICE, PROGRAM, AND CONTROL METHOD

(71) Applicant: TOYOTA JIDOSHA KABUSHIKI KAISHA, Aichi-ken (JP)

(72) Inventors: Takumi Shibano, Nagoya (JP); Kazutaka Kimura, Mishima (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 315 days.

(21) Appl. No.: 17/397,996

(22) Filed: Aug. 10, 2021

(65) Prior Publication Data

US 2022/0149654 A1  May 12, 2022

(30) Foreign Application Priority Data

Nov. 6, 2020  (JP) ................................. 2020-185968

(51) Int. Cl.
*G06F 17/00*   (2019.01)
*H02J 3/38*    (2006.01)
(Continued)

(52) U.S. Cl.
CPC ........ *H02J 13/00006* (2020.01); *H02J 3/381* (2013.01); *G05B 19/042* (2013.01); *G05B 2219/2639* (2013.01)

(58) Field of Classification Search
CPC ................. H02J 13/00006; H02J 3/381; H02J 13/00001; H02J 13/00002; H02J 2300/20;
(Continued)

(56) References Cited

U.S. PATENT DOCUMENTS

| 7,873,485 B2 * | 1/2011 | Castelli | G06Q 30/0207 |
| | | | 702/61 |
| 2009/0177458 A1 * | 7/2009 | Hochart | G06T 17/05 |
| | | | 707/999.01 |

(Continued)

FOREIGN PATENT DOCUMENTS

JP           202072637 A     5/2020

OTHER PUBLICATIONS

Lilliu, Fabio, et al. "A novel payment scheme for trading renewable energy in smart grid." Proceedings of the Tenth ACM International Conference on Future Energy Systems. 2019 (Year: 2019).*

(Continued)

*Primary Examiner* — Andrew T McIntosh
(74) *Attorney, Agent, or Firm* — HAUPTMAN HAM, LLP (57) ABSTRACT

A control device that is communicably connected to a user terminal includes a controller, in which the controller is configured to set a virtual space, select one or more virtual spots from a plurality of candidate locations in the virtual space in accordance with associated values with a plurality of users belonging to a real specific region, install a virtual renewable energy power plant at the selected virtual spot in the virtual space, generate image information in which information regarding a real renewable energy power plant that is installed at a real spot corresponding to the selected virtual spot is displayed in association with the installed virtual renewable energy power plant, and transmit the image information to the user terminal.

24 Claims, 7 Drawing Sheets

(51) Int. Cl.
*H02J 13/00* (2006.01)
*G05B 19/042* (2006.01)

(58) Field of Classification Search
CPC .......... G05B 19/042; G05B 2219/2639; Y02E 40/70; Y02E 60/00; Y04S 10/12; Y04S 40/12
See application file for complete search history.

(56) References Cited

U.S. PATENT DOCUMENTS

2009/0287408 A1* 11/2009 Gerdes ............... G01C 21/3423
701/533
2011/0246338 A1* 10/2011 Eich ....................... G06F 30/00
705/28

OTHER PUBLICATIONS

Ghorashi, Seyed Morteza, et al. "Optimal design of reward-penalty demand response programs in smart power grids." Sustainable Cities and Society 60 (2020): 102150 (Year: 2020).*

Yeo, In-Ae, and Jurng-Jae Yee. "A proposal for a site location planning model of environmentally friendly urban energy supply plants using an environment and energy geographical information system (E-GIS) database (DB) and an artificial neural network (ANN)." Applied Energy 119 (2014): 99-117 (Year: 2014).*

Dileep, G. J. R. E. "A survey on smart grid technologies and applications." Renewable energy 146 (2020): 2589-2625. (Year: 2020).*

* cited by examiner

| USER ID | REGION ID | POINTS |
|---------|-----------|--------|
| U01 | A01 | 100 |
| U02 | A01 | 500 |
| U03 | A02 | 300 |
| ⋮ | ⋮ | ⋮ |

| REGION ID | VIRTUAL SPOT ID | REAL SPOT ID |
|---|---|---|
| A01 | VS03 | RS01 |
| ⋮ | ⋮ | ⋮ |

CONTROL DEVICE, PROGRAM, AND CONTROL METHOD

CROSS-REFERENCE TO RELATED APPLICATION

This application claims priority to Japanese Patent Application No. 2020-185968 filed on Nov. 6, 2020, incorporated herein by reference in its entirety.

BACKGROUND

1. Technical Field

The present disclosure relates to a control device, a program, and a control method.

2. Description of Related Art

In the related art, a technique for generating power by using renewable energy is known (for example, Japanese Unexamined Patent Application Publication No. 2020-072637 (JP 2020-072637 A)).

SUMMARY

In JP 2020-072637 A, power generation is not performed on a regional unit. Therefore, there is room for improvement from the viewpoint of raising the environmental awareness of local residents.

The present disclosure is made in view of such circumstances and is to provide a control device, a program, and a control method capable of improving the environmental awareness of the local residents.

A first aspect of the present disclosure relates to a control device that is communicably connected to a user terminal. The control device includes a controller. The controller is configured to set a virtual space, select one or more virtual spots from a plurality of candidate locations in the virtual space in accordance with associated values with a plurality of users belonging to a real specific region, install a virtual renewable energy power plant at the selected virtual spot in the virtual space, generate image information in which information regarding a real renewable energy power plant that is installed at a real spot corresponding to the selected virtual spot is displayed in association with the installed virtual renewable energy power plant, and transmit the image information to the user terminal.

A second aspect of the present disclosure relates to a program that causes a computer as a control device that is communicably connected to a user terminal to execute operations. The operations include setting a virtual space, selecting one or more virtual spots from a plurality of candidate locations in the virtual space in accordance with associated values with a plurality of users belonging to a real specific region, installing a virtual renewable energy power plant at the selected virtual spot in the virtual space, generating image information in which information regarding a real renewable energy power plant that is installed at a real spot corresponding to the selected virtual spot is displayed in association with the installed virtual renewable energy power plant, and transmitting the image information to the user terminal.

A third aspect of the present disclosure relates to a control method by a control device that is communicably connected to a user terminal. The control method includes setting a virtual space, selecting one or more virtual spots from a plurality of candidate locations in the virtual space in accordance with associated values with a plurality of users belonging to a real specific region, installing a virtual renewable energy power plant at the selected virtual spot in the virtual space, generating image information in which information regarding a real renewable energy power plant that is installed at a real spot corresponding to the selected virtual spot is displayed in association with the installed virtual renewable energy power plant, and transmitting the image information to the user terminal.

With the control device, program, and control method according to the aspects of the present disclosure, the environmental awareness of the local residents can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
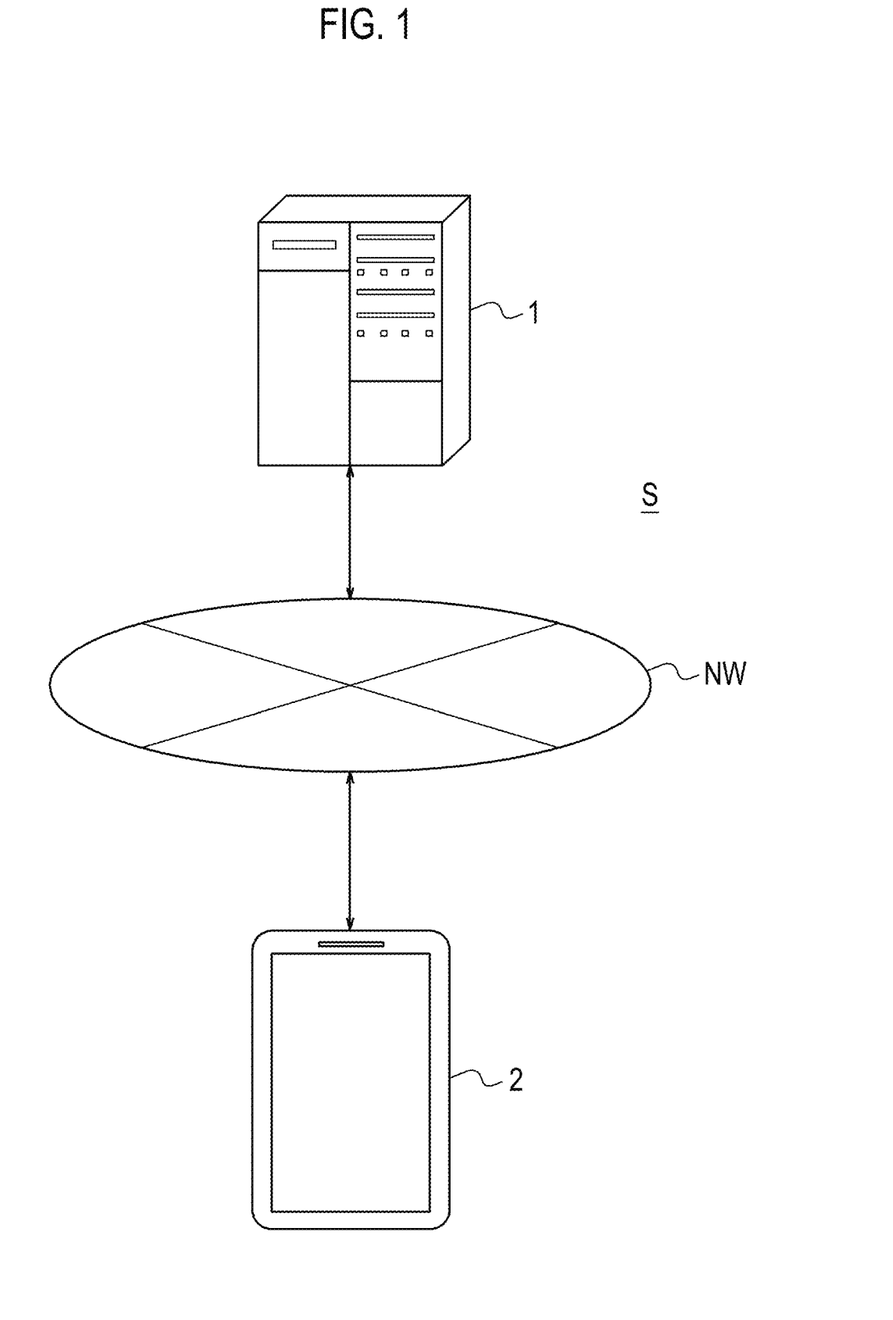
FIG. 1 is a schematic diagram of an information processing system.

FIG. 1 is a schematic diagram of an information processing system S according to the present embodiment. The information processing system S includes a control device 1 and a user terminal 2 that are communicably connected to each other via a network NW. The network NW includes a mobile communication network and the Internet, for example.

In FIG. 1, for the sake of simplicity, one control device 1 and one user terminal 2 are shown. However, the number of the control devices 1 and the number of the user terminals 2 are not limited thereto. For example, processing executed by the control device 1 according to the present embodiment may be executed by a plurality of distributed control devices 1. A plurality of the user terminals 2 may be operated by a user.

An outline of the processing executed by the control device 1 according to the present embodiment will be described. The control device 1 sets a virtual space and selects one or more virtual spots from a plurality of candidate locations in the virtual space in accordance with associated values with the users belonging to a real specific region. Further, the control device 1 installs a virtual renewable energy power plant at the selected virtual spot in the virtual space. The control device 1 generates image information in which information regarding a real renewable energy power plant that is installed at a real spot corresponding to the selected virtual spot is displayed in association with the installed virtual renewable energy power plant. The control device 1 transmits the image information to the user terminal 2. With this configuration, the control device 1 can show the information regarding the real renewable energy power plant in association with the virtual renewable energy power plant to the user of the user terminal 2. Therefore, the control device 1 can allow the user to enjoyably perform, like a game, installing the renewable energy power plant and confirming the information regarding the power plant. As described above, the control device 1 can improve the environmental awareness of local residents.

The control device 1 is a computer, such as a server belonging to a cloud computing system or other computing systems. The control device 1 may be installed in a facility, such as a data center.

Figure 2:
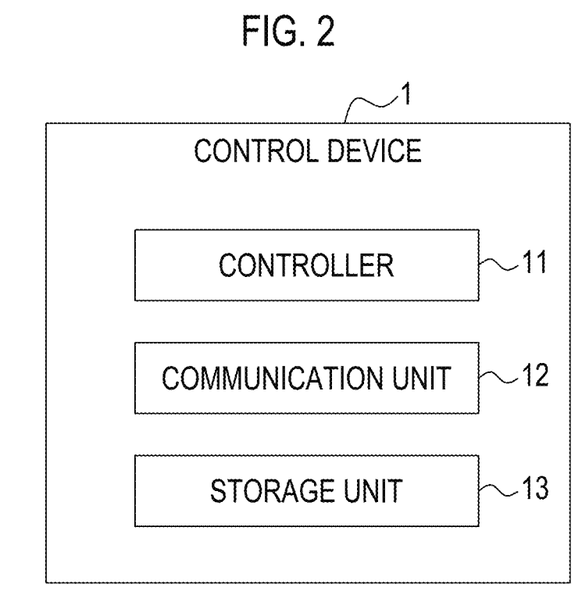
FIG. 2 is a block diagram showing a configuration of a control device.

An internal configuration of the control device 1 will be described in detail with reference to FIG. 2.

The control device 1 includes a controller 11, a communication unit 12, and a storage unit 13. The components of the control device 1 are communicably connected to each other via, for example, a dedicated line.

The controller 11 includes, for example, one or more general-purpose processors including a central processing unit (CPU) or a micro processing unit (MPU). The controller 11 may include one or more dedicated processors specialized for specific processing. The controller 11 may include one or more dedicated circuits instead of including the processor. The dedicated circuit may be, for example, a field-programmable gate array (FPGA) or an application specific integrated circuit (ASIC). The controller 11 may include an electronic control unit (ECU).

The communication unit 12 includes a communication module that supports one or more wired or wireless local area network (LAN) standards that is connected to the network NW. The communication unit 12 may include a module that supports one or more mobile communication standards including long term evolution (LTE), 4th generation (4G), or 5th generation (5G). The communication unit 12 may include a communication module that supports one or more short-range communication standards or specifications including Bluetooth (registered trademark), AirDrop (registered trademark), IrDA, ZigBee (registered trademark), FeliCa (registered trademark), or RFID. The communication unit 12 transmits and receives any information via the network NW.

The storage unit 13 includes, for example, a semiconductor memory, a magnetic memory, an optical memory, or a combination of at least two of these memories, but is not limited thereto. The semiconductor memory is, for example, a RAM or a ROM. The RAM is, for example, an SRAM or a DRAM. The ROM is, for example, an EEPROM. The storage unit 13 may function as, for example, a main storage device, an auxiliary storage device, or a cache memory. The storage unit 13 may store information of the result of analysis or processing by the controller 11. The storage unit 13 may store various information and the like related to the operations or the controls of the control device 1. The storage unit 13 may store a system program, an application program, an embedded software, and the like. The storage unit 13 includes a user DB and a region DB to be described below.

The user terminal 2 is a terminal operated by the user. The user terminal 2 is, for example, a mobile device, such as a mobile phone, a smartphone, a wearable device, or a tablet.

The user terminal 2 may be, for example, a general-purpose device, such as a PC, or a dedicated device. The "PC" is an abbreviation for personal computer.

Figure 3:
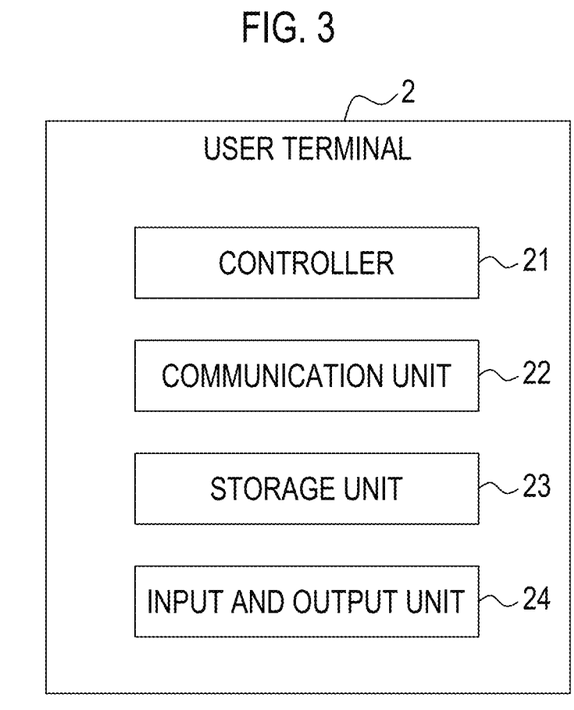
FIG. 3 is a block diagram showing a configuration of a user terminal.

The internal configuration of the user terminal 2 will be described in detail with reference to FIG. 3.

The user terminal 2 includes a controller 21, a communication unit 22, a storage unit 23, and an input and output unit 24. The components of the user terminal 2 are communicably connected to each other via, for example, a dedicated line.

The hardware configurations of the controller 21, the communication unit 22, and the storage unit 23 of the user terminal 2 may be the same as the hardware configurations of the controller 11, the communication unit 12, and the storage unit 13 of the control device 1. The description is omitted herein.

The input and output unit 24 includes at least one input interface. The input interface is, for example, a physical key, an electrostatic capacity key, a pointing device, a touch screen provided integrally with a display, or a microphone. The input and output unit 24 accepts an operation of inputting information used for the operation of the user terminal 2. The input and output unit 24 may be connected to the user terminal 2 as an external input device instead of being provided in the user terminal 2. As the connecting method, for example, any method, such as a USB, HDMI (registered trademark), or Bluetooth (registered trademark), can be used. The "USB" is an abbreviation for universal serial bus. The "HDMI (registered trademark)" is an abbreviation for high-definition multimedia interface.

Further, the input and output unit 24 includes at least one output interface. The output interface is, for example, a display or a speaker. The display is, for example, an LCD or an organic EL display. The "LCD" is an abbreviation for liquid crystal display. The "EL" is an abbreviation for electroluminescence. The input and output unit 24 outputs information obtained by the operation of the user terminal 2. The input and output unit 24 may be connected to the user terminal 2 as an external output device instead of being provided in the user terminal 2. As the connecting method, for example, any method, such as a USB, HDMI (registered trademark), or Bluetooth (registered trademark), can be used.

Hereinafter, the processing executed by the information processing system S according to the present embodiment will be described in detail. Here, as an example, a scene will be described in which one or more users who reside in the specific region take environmentally friendly behavior and acquire points in accordance with the behavior. An operating company or the like in the specific region makes an investment in accordance with the acquired points and installs the renewable energy power plant. The users who participate in the installation of the renewable energy power plant may be all users who reside in the specific region or solely desired users.

Here, the renewable energy is recognized to be capable of being permanently used as an energy source among non-fossil energy sources. The renewable energy includes, for example, at least one of the following.

solar light
wind power
hydroelectric power
geothermal heat
solar heat
heat in the atmosphere and another heat present in nature
biomass (organic matter derived from animals and plants)

Figure 4:
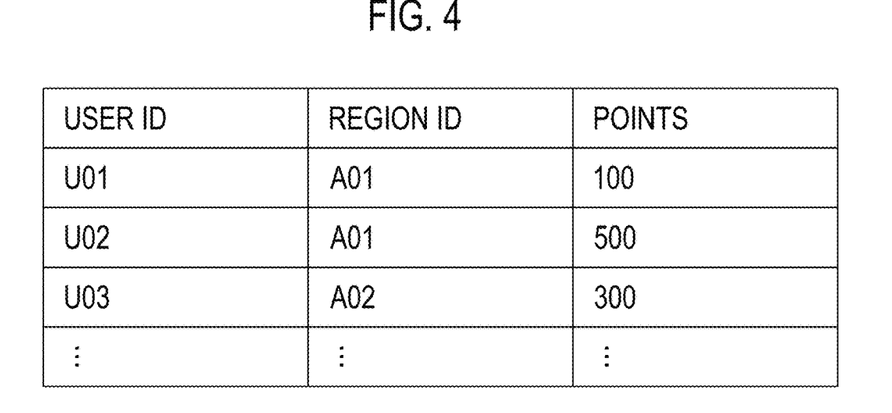
FIG. 4 is a table showing a data structure of a user database (DB)

As shown in FIG. 4, in the user DB, the points are stored in association with a user ID and a region ID. The point is an example of associated values with the user ID and the region ID. The region ID is an identifier of the region to which the user belongs (for example, resides).

In a case where the control device 1 detects that the user takes the environmentally friendly behavior by any method, the control device 1 stores the points in accordance with the behavior in the user DB. As described above, the control device 1 gives the points to the user. The user DB may be created by any business operator as an alternative example. The environmentally friendly behavior may be, for example, the following.

recycle
purchase of an eco-friendly product
power saving
use of renewable energy generated at installed renewable energy power plant The control device 1 determines the associated values with the users belonging to the specific region at any point in time. For example, the control device 1 determines whether or not the total point in the specific region reaches a reference value. As an example, the reference value is 600 points herein. As shown in FIG. 4, the points associated with a region A01 are 600 points in total of 100 points of a user U01 and 500 points of a user U02. The control device 1 determines that the total point of the region A01 reaches the reference value.

As an alternative example, the control device 1 may determine whether or not the total amount of investments from the users who reside in the specific region reaches the reference value, instead of determining whether or not the points reach the reference value. In this case, the amounts of investments from the users are the associated values with the users.

Figure 5:
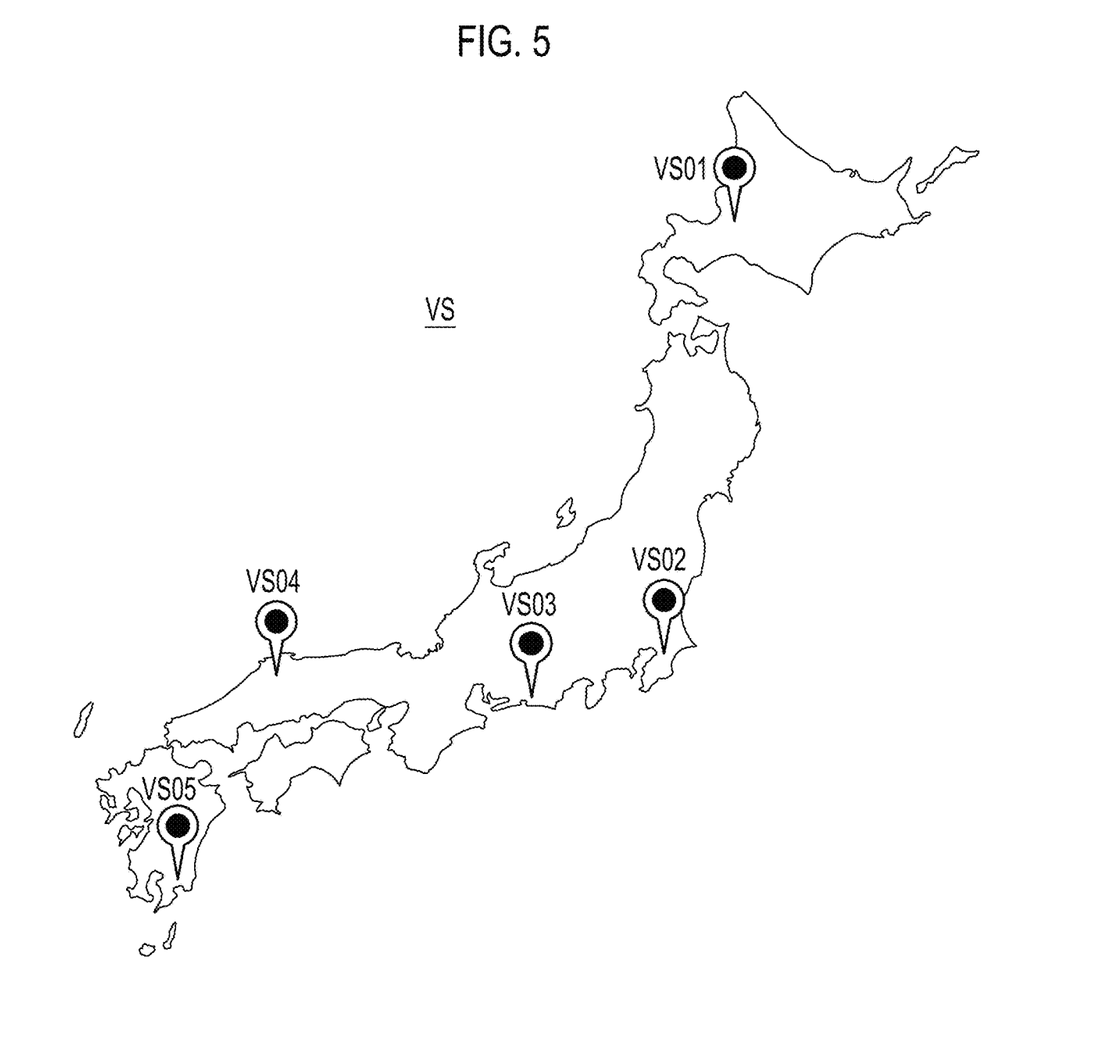
FIG. 5 is a diagram showing a virtual space in which a virtual spot as a candidate location is shown.

As shown in FIG. 5, the control device 1 sets a virtual space VS. The virtual space VS is a virtual map. The virtual map matches or substantially matches a map in the real world. Here, as an example, the virtual space VS is a map of Japan, but is not limited thereto. For example, the virtual space VS may be set in a game played on the user terminal 2.

The control device 1 shows virtual spots VS01 to VS05 as the candidate locations at which the virtual renewable energy power plant is installed in the virtual space VS. The user terminal 2 of any user belonging to the region A01 displays the virtual space VS and accepts the selection from the user. Here, the number of selected spots is one. However, as the alternative example, the number of selected spots may be two or more.

The control device 1 may give the selection right to all the users belonging to the region A01, or may give the selection right solely to the user (here, the user UO2) having the largest associated value (here, the point) among all the users belonging to the region A01. As an alternative example, in a case where the renewable energy power plant is installed based on the total amount of investments, the control device 1 may give the right of selection solely to the user having the largest amount of the investments.

Figure 6:
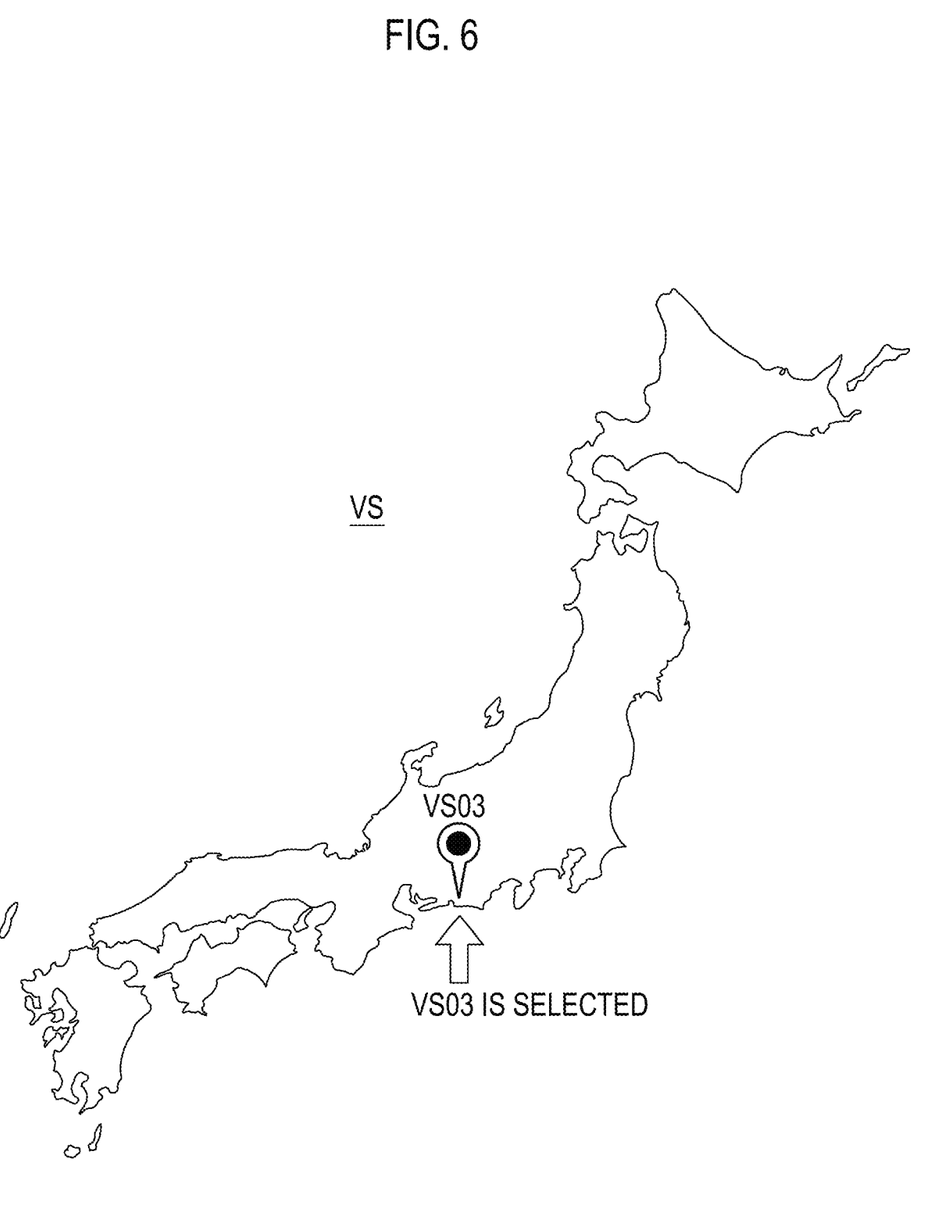
FIG. 6 is a diagram showing a virtual space in which selected virtual spot is shown.

Here, as an example, a case where a virtual spot VS03 is selected will be described. The user terminal 2 transmits a result of selection to the control device 1. The control device 1 selects the virtual spot VS03. As shown in FIG. 6, the user terminal 2 displays that the virtual spot VS03 in the virtual space VS is selected.

Figure 7:
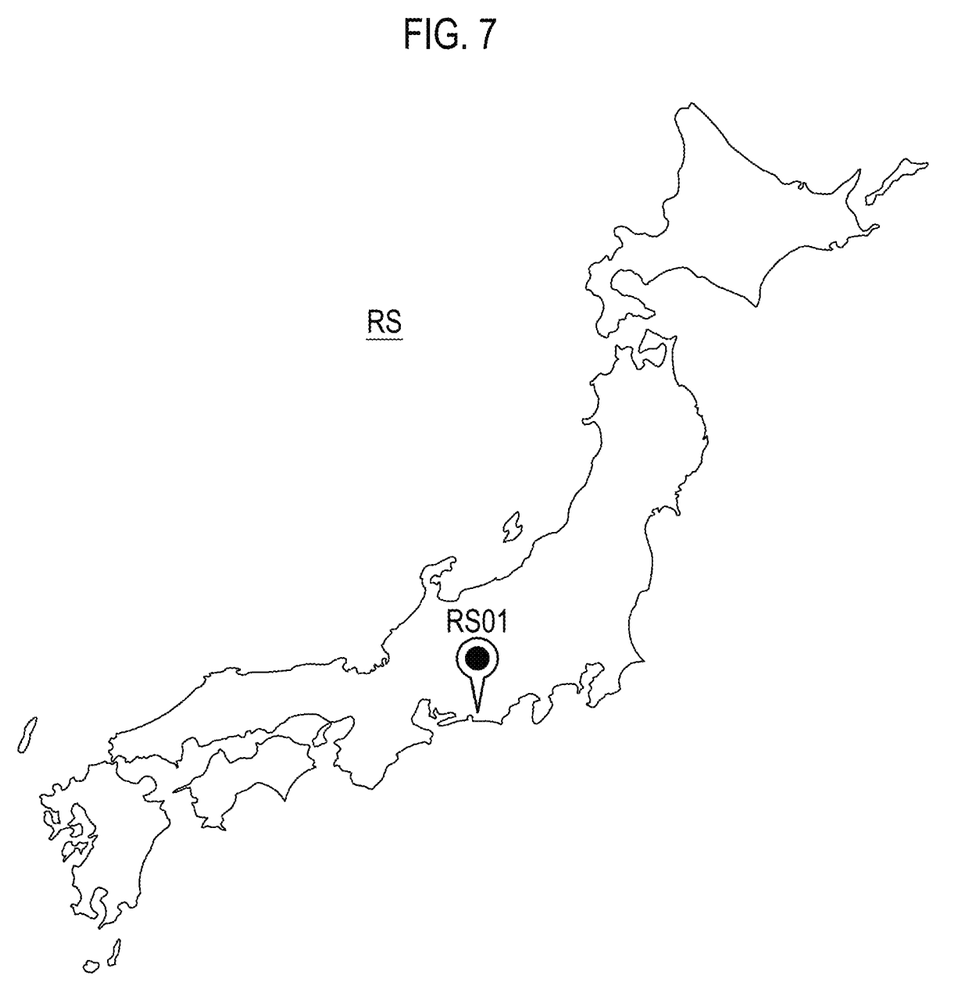
FIG. 7 is a diagram showing a real space.

The control device 1 requests an electricity business operator or the like to install the real renewable energy power plant at a real spot RS01 (see FIG. 7) corresponding to the virtual spot VS03. The real spot RS01 is a spot in a real space RS. The pace of installation may be, for example, 1 to 2 years per power plant, but is not limited thereto.

Figure 8:
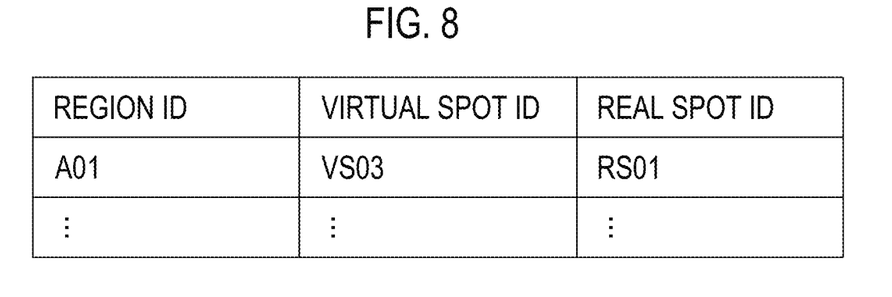
FIG. 8 is a table showing a data structure of a region DB.

The real renewable energy power plant will be installed in association with the region A01. As shown in FIG. 8, the control device 1 stores a virtual spot ID and a real spot ID in the region DB in association with the region ID. Here, the virtual spot VS03 and the real spot RS01 are stored in association with the region A01.

Figure 9:
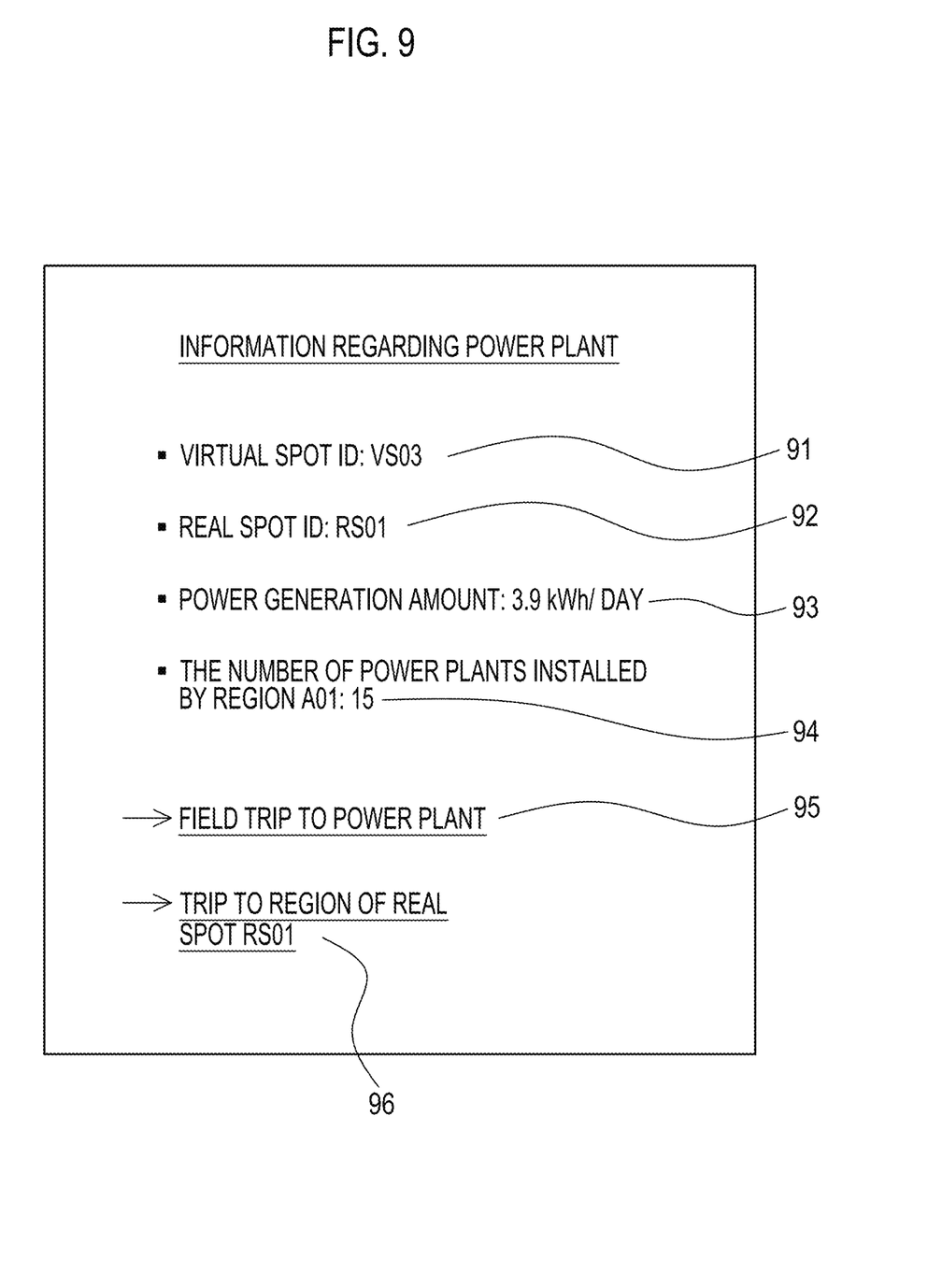
FIG. 9 is a diagram showing information regarding a power plant.

The control device 1 acquires the information regarding the real renewable energy power plant installed at the real spot RS01 from the electricity business operator or the like, and generates image information in which the information is displayed. The image information shown in FIG. 9 displays, for example, the following information.

an identifier 91 of the virtual spot at which the corresponding virtual renewable energy power plant is installed
an identifier 92 of the real spot at which the real renewable energy power plant is installed
a power generation amount 93 in the real renewable energy power plant at the real spot RS01
a total number 94 of real renewable energy power plants installed in association with the region A01
link 95 to a page posting a procedure for a field trip to the real renewable energy power plant at the real spot RS01
link 96 to a page posting a procedure for a trip to the region to which the real spot RS01 belongs As shown in FIG. 9, the control device 1 displays the information regarding the real renewable energy power plant installed at the real spot RS01 in association with the virtual renewable energy power plant installed at the virtual spot VS03 in the image information.

In addition, the information regarding the renewable energy power plant may include the number of real renewable energy power plants that are increased within a reference period in association with the region A01. The reference period can be optionally set by the user.

The control device 1 transmits the generated image information to the user terminal 2. The user terminal 2 displays the acquired image information.

In addition to the information regarding the real renewable energy power plant installed in association with the region A01, the control device 1 may transmit information regarding another real renewable energy power plant installed in association with another region A02 to the user terminal of the user belonging to the region A01 and the region A02. The user terminal 2 displays the received information. As a result, the information pieces regarding the renewable energy power plants of the region A01 and the region A02 can be compared.

The control device 1 may newly give the points to a region in which the power generation amount is large or a region in which the number of installed power plants is large. The control device 1 may transmit a result of comparison to the user terminal of the user belonging to the region A01 or the region A02.

As an alternative example, the control device 1 may calculate a ranking between regions for the information regarding the renewable energy power plants installed by each of two or more regions. The control device 1 may transmit ranking information to the user terminal of each of users belonging to two or more regions.

The control device 1 may change the associated value with the specific region in accordance with the information regarding the renewable energy power plant. The control device 1 may increase the points associated with a predetermined number of regions ranked high in the ranking, for example. When the points reach the reference value, a new renewable energy power plant can be installed.

Figure 10:
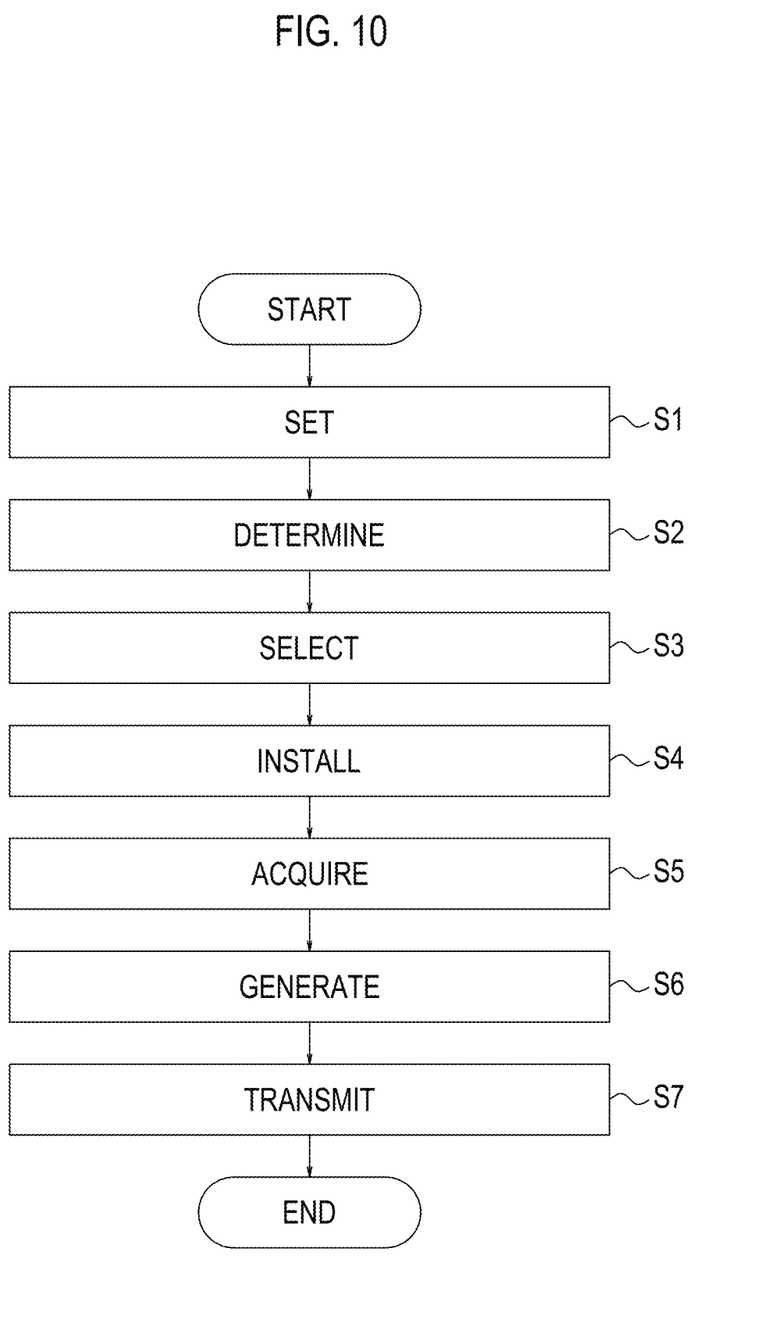
FIG. 10 is a flowchart showing an operation of the control device.

A control method by the control device 1 of the present embodiment will be described with reference to FIG. 10.

In step S1, the control device 1 sets the virtual space VS at any point in time.

In step S2, the control device 1 determines the associated values with the users belonging to the real specific region.

In step S3, the control device 1 selects one or more virtual spots from the candidate locations in the virtual space VS in accordance with the associated values with the users.

In step S4, the control device 1 installs the virtual renewable energy power plant at the selected virtual spot.

In step S5, the control device 1 acquires the information regarding the real renewable energy power plant installed at the real spot corresponding to the selected virtual spot from any database.

In step S6, the control device 1 generates the image information in which the acquired information in association with the installed virtual renewable energy power plant is displayed.

In step S7, the control device 1 transmits the generated image information to the user terminal 2.

As described above, according to the present embodiment, the control device 1 sets the virtual space and selects one or more virtual spots from the candidate locations in the virtual space in accordance with associated values with the users belonging to the real specific region. The control device 1 installs the virtual renewable energy power plant at the selected virtual spot in the virtual space, generates the image information in which the information regarding the real renewable energy power plant that is installed at the real spot corresponding to the selected virtual spot is displayed in association with the installed virtual renewable energy power plant, and transmits the image information to the user terminal. With this configuration, the control device 1 can show the information regarding the real renewable energy power plant in association with the virtual renewable energy power plant to the user of the user terminal 2. Therefore, the control device 1 can allow the user to enjoyably perform, like a game, installing the renewable energy power plant and collecting the information regarding the power plant. As described above, the control device 1 can improve the environmental awareness of the local residents.

Further, according to the present embodiment, the selected one or more virtual spots are the virtual spots selected by the user having the largest associated value among the users. With this configuration, the control device 1 can give an incentive to the user who makes the largest contribution and promote the contribution.

Further, according to the present embodiment, the associated value includes the points given in accordance with the environmentally friendly behavior of the users or the amounts of investments from the users. With this configuration, the control device 1 can make a selection by using various indexes, and thus the environmental awareness of the local residents can be improved in various scenes.

Further, according to the present embodiment, the information regarding the real renewable energy power plant includes at least one of the power generation amount in the real renewable energy power plant, the number of real renewable energy power plants that are installed in association with the specific region, and the number of real renewable energy power plants that are increased within the reference period in association with the specific region. With this configuration, the control device 1 can quantify the degree of contribution of the user and give a notice to the user, and thus the user can easily recognize the degree of his or her contribution.

Further, according to the present embodiment, the control device 1 transmits the information regarding the real renewable energy power plant installed in association with the specific region and the information regarding another real renewable energy power plant installed in association with another region to the user terminal 2. With this configuration, the user of the user terminal 2 can compare the specific region to which he or she belongs with another region, and thus the user can enjoy a match like a game.

Further, according to the present embodiment, the control device 1 transmits the information regarding the field trip to the real renewable energy power plant or the information regarding the trip to the region to which the real renewable energy power plant belongs to the user terminal 2. With this configuration, the control device 1 allows the user of the user terminal 2 to visit the real renewable energy power plant or the region of the real renewable energy power plant. Therefore, the control device 1 can provide a real experience as well as a virtual experience to the user.

Further, according to the present embodiment, the control device 1 changes the associated value with the specific region in accordance with the information regarding the renewable energy power plant. With this configuration, the control device 1 can increase the associated value with the region, for example, when the information regarding the renewable energy power plant is excellent. Therefore, the control device 1 can give an incentive to improve the information regarding the renewable energy power plant to the user, and can further promote the contribution.

Although the present disclosure has been described based on the drawings and the embodiment, it should be noted that those skilled in the art may make various modifications and variations based on the present disclosure. Other modifications are possible without departing from the spirit of the present disclosure. For example, the functions and the like included in each unit or each step can be rearranged so as not to logically contradict, and a plurality of units or steps can be combined or divided into one.

For example, in the above embodiment, the program that causes executing of all or a part of the functions or processing of the control device 1 can be recorded on a computer-readable recording medium. The computer-readable recording medium includes a non-transitory computer-readable medium, such as a magnetic recording device, an optical disc, an opto-magnetic recording medium, or a semiconductor memory. The program is distributed, for example, by selling, transferring, or renting a portable recording medium, such as a digital versatile disc (DVD) or a compact disc read only memory (CD-ROM), on which the program is recorded. Further, the program may be distributed by storing the program in a storage of any server and transmitting the program from any server to another computer. Also, the program may be provided as a program product. Also, the present disclosure can be realized as a program that can be executed by a processor.

The computer temporarily stores, for example, the program recorded on the portable recording medium or the program transferred from the server in the main storage device. Then, the computer reads the program stored in the main storage device by the processor, and executes the processing in accordance with the read program by the processor. The computer may read the program directly from the portable recording medium and execute processing in accordance with the program. The computer may sequentially execute the processing in accordance with the received program each time the program is transferred from the server to the computer. The computer may execute the processing by a so-called ASP type service that realizes the function solely by the execution command and the result acquisition without transferring the program from the server to the computer. The "ASP" is an abbreviation for application service provider. The program includes information used for processing by an electronic computer and equivalent to the program. For example, data that is not a direct command to the computer but has the property of defining the processing of the computer corresponds to "equivalent to the program".

What is claimed is:

1. A control device that is communicably connected to a plurality of user terminals, the control device comprising a controller,
wherein the controller is configured to:
set a virtual space,
wirelessly transmit information to a user terminal selected from the plurality of user terminals in accordance with an associated value of a corresponding user of a plurality of users belonging to a real specific region, the information indicating a plurality of candidate locations in the virtual space,
receive a selection from the user terminal of one or more virtual spots from among the plurality of candidate locations,
install a virtual renewable energy power plant at the selected virtual spot in the virtual space,
generate image information in which information regarding a real renewable energy power plant corresponding to the virtual renewable energy power plant, and
wirelessly transmit the image information to the user terminal.

2. The control device according to claim 1, wherein the selected one or more virtual spots are virtual spots selected by a user having a largest associated value among the users.

3. The control device according to claim 1, wherein the associated value includes points given in accordance with environmentally friendly behavior of the users or amounts of investments from the users.

4. The control device according to claim 3, wherein the controller is configured to give the points to a region in which a power generation amount is large or a region in which the number of installed power plants is large.

5. The control device according to claim 1, wherein the information regarding the real renewable energy power plant includes at least one of a power generation amount in the real renewable energy power plant, the number of real renewable energy power plants that are installed in association with the specific region, or the number of real renewable energy power plants that are increased within a reference period in association with the specific region.

6. The control device according to claim 1, wherein the controller is configured to transmit the information regarding the real renewable energy power plant that is installed in association with the specific region and information regarding another real renewable energy power plant that is installed in association with another region to the user terminal.

7. The control device according to claim 1, wherein the controller is configured to transmit information regarding a field trip to the real renewable energy power plant or information regarding a trip to a region to which the real renewable energy power plant belongs to the user terminal.

8. The control device according to claim 1, wherein the controller is configured to change an associated value with the specific region in accordance with the information regarding the renewable energy power plant.

9. The control device according to claim 1, wherein the controller is configured to generate and wirelessly transmit a request to install the real renewable energy power plant at a real spot corresponding to the selected virtual spot.

10. The control device according to claim 9, wherein the controller is configured to calculate a ranking between regions for the information regarding the real renewable energy power plant that is installed in association with the specific region and information regarding another real renewable energy power plant that is installed in association with another region, and transmit information about the ranking between regions to each of the plurality of users associated with two or more regions.

11. The control device according to claim 1, wherein the controller is configured to determine the associated values of each of the plurality of users belonging to the real specific region.

12. A non-transitory computer-readable medium storing a code that causes a computer as a control device that is communicably connected to a user terminal to execute operations including
setting a virtual space,
wirelessly transmitting information to a user terminal selected from the plurality of user terminals in accordance with an associated value of a corresponding user of a plurality of users belonging to a real specific region, the information indicating,
receiving a selection from the user terminal of one or more virtual spots from among the plurality of candidate locations,
installing a virtual renewable energy power plant at the selected virtual spot in the virtual space,
generating image information in which information regarding a real renewable energy power plant corresponding to the virtual renewable energy power plant, and
transmitting the image information to the user terminal.

13. The non-transitory computer-readable medium according to claim 12, wherein the selected one or more virtual spots are virtual spots selected by a user having a largest associated value among the users.

14. The non-transitory computer-readable medium according to claim 12, wherein the associated value includes points given in accordance with environmentally friendly behavior of the users or amounts of investments from the users.

15. The non-transitory computer-readable medium according to claim 12, wherein the information regarding the real renewable energy power plant includes at least one of a power generation amount in the real renewable energy power plant, the number of real renewable energy power plants that are installed in association with the specific region, and the number of real renewable energy power plants that are increased within a reference period in association with the specific region.

16. The non-transitory computer-readable medium according to claim 12, wherein the program further causes the computer to execute an operation of transmitting the information regarding the real renewable energy power plant that is installed in association with the specific region and information regarding another real renewable energy power plant that is installed in association with another region to the user terminal.

17. The non-transitory computer-readable medium according to claim 12, wherein the program further causes the computer to execute an operation of transmitting information regarding a field trip to the real renewable energy power plant or information regarding a trip to a region to which the real renewable energy power plant belongs to the user terminal.

18. The non-transitory computer-readable medium according to claim 12, wherein the program further causes the computer to execute an operation of changing an associated value with the specific region in accordance with the information regarding the renewable energy power plant.

19. A control method by a control device that is communicably connected to a user terminal, the control method comprising:
  setting a virtual space;
  wirelessly transmitting information to a user terminal selected from the plurality of user terminals in accordance with an associated value of a corresponding user of a plurality of users belonging to a real specific region, the information indicating a plurality of candidate locations in the virtual space;
  receiving a selection from the user terminal of one or more virtual spots from among the plurality of candidate locations;
  installing a virtual renewable energy power plant at the selected virtual spot in the virtual space;
  generating image information in which information regarding a real renewable energy power plant corresponding to the virtual renewable energy power plant; and
  transmitting the image information to the user terminal.

20. The control method according to claim 19, wherein the selected one or more virtual spots are virtual spots selected by a user having a largest associated value among the users.

21. The control method according to claim 19, wherein the associated value includes points given in accordance with environmentally friendly behavior of the users or amounts of investments from the users.

22. The control method according to claim 19, wherein the information regarding the real renewable energy power plant includes at least one of a power generation amount in the real renewable energy power plant, the number of real renewable energy power plants that are installed in association with the specific region, or the number of real renewable energy power plants that are increased within a reference period in association with the specific region.

23. The control method according to claim 19, further comprising transmitting the information regarding the real renewable energy power plant that is installed in association with the specific region and information regarding another real renewable energy power plant that is installed in association with another region to the user terminal.

24. The control method according to claim 19, further comprising transmitting information regarding a field trip to the real renewable energy power plant or information regarding a trip to a region to which the real renewable energy power plant belongs to the user terminal.

\* \* \* \* \*